US006135265A

United States Patent [19]

DiSaverio et al.

[11] Patent Number: 6,135,265

[45] Date of Patent: Oct. 24, 2000

[54] MAIL HANDLING TOWER WITH EXTENDED CONVEYOR

[75] Inventors: Charles Thomas DiSaverio, Apalachin; James Robert Malia, Owego, both of N.Y.

[73] Assignee: Lockheed Martin Corp., Owego, N.Y.

[21] Appl. No.: 09/259,954

[22] Filed: Feb. 27, 1999

[51] Int. Cl.[7] .................................................... B65G 25/00

[52] U.S. Cl. ........................................ 198/464.4; 209/900

[58] Field of Search .......................... 198/464.4; 209/900

[56] References Cited

U.S. PATENT DOCUMENTS

| | | | |
|---|---|---|---|
| 1,310,231 | 7/1919 | Ahlen et al. | 198/464.4 |
| 2,546,281 | 3/1951 | Talbot | 198/464.4 |
| 4,798,040 | 1/1989 | Haas et al. | 198/464.4 |
| 5,518,122 | 5/1996 | Tilles et al. | 198/464.4 |

*Primary Examiner*—Thomas J. Brahan

*Attorney, Agent, or Firm*—W. H. Meise; R. P. Cogan

[57] ABSTRACT

A mail-handling tower (10) is associated with a mail container conveyor (12, 312). AC line power is supplied to the tower, which in turn supplies power at low voltage to power the associated conveyor directly by way of two ports (20*a*, 20*b*) and indirectly by way of a third, higher-voltage port (20*c*). A power cut-off switch (8) allows emergency shutdown of the mechanical portions of the tower, and also cuts power from the conveyor (12) powered from the tower ports. The power available at the conveyor energizing ports (20*a*, 20*b*, and 20*c*) allows a maximum run of conveyor. When the conveyor must be run for a greater distance than that which can be powered from the tower, an additional conveyor section (312) is coupled to the remote end (12*re*) of the first conveyor (12), and a line power source (314) is transformed (320) to a lower voltage, and applied to a power port ($\mathbf{240}_1$, $\mathbf{260}_1$) of the additional conveyor (312). In order to avoid having the second conveyor run in the event that the tower it feeds is deenergized, a relay (316) cuts the additional line power source.

1 Claim, 3 Drawing Sheets

MAIL HANDLING TOWER WITH EXTENDED CONVEYOR

FIELD OF THE INVENTION

This invention relates to mail-handling devices, and more particularly to buffers by which the flow of mail containers may be delayed.

BACKGROUND OF THE INVENTION

The processing of mail is highly important, and many postal systems are automating their mail-handling facilities. Various automatic machines are known for sorting mail. Machinery is known for handling containers, such as flat trays of mail, as it moves from one location or station within a postal facility to another location for further processing. The container-handling machinery includes buffers which provide delays between the time a container arrives in the general area of a processing station and the time such mail actually arrives at the processing station itself.

The buffers may be in the form of a tower which includes vertically-moving bins, each of which accepts one flat tray or tub of mail. FIG. 1 illustrates a tower 10.

The bins (not illustrated) may move upward or downward, but in any case, provide a delay between the time a flat tray or tub arrives at the input port of the tower, and the time it exits from an output port. This is referred to as "staging" of the flat trays or tubs. Of course, it is disadvantageous to load and unload the towers by hand. Instead, the flat trays or tubs arrive at the input port of the tower on a conveyor device, and likewise leave on a conveyor. In FIG. 1, the mail containers move toward the left on an input conveyor designated generally as 12, enter an input port 10*i* near the top of the tower 10, and flow from an output port 10*o* near the bottom of the tower 10 onto a conveyor 14. Mail containers flow from the left end of conveyor 14 to a mail processing station.

The towers, such as tower 10 of FIG. 1, are placed in the vicinity of the mail-processing stations, so as to make the job of moving mail from the tower to the processing station easy for the operator. This requires that an AC power outlet, such as 16 of FIG. 1, be provided near the tower, for powering the tower, as described, for example, in U.S patent application Ser. No. 09/197,628, filed Nov. 23, 1998, in the name of DiSaverio et al. The conveyor 12 associated with the input port of the tower must extend to the mail source tilt tray 18, or possibly a preceding tower.

In order to simplify the installation and control of the towers, they are manufactured as assemblies prior to installation. Since any tower may be used with or without conveyors in various arrangements in which it may be used, the towers as manufactured are arranged for multiple uses. In order to accommodate those situations in which the tower will be used with a conveyor, a port is provided for providing power from the tower to the conveyor. Since there may be a conveyor associated with both mail container ports of the tower, each of the mail container ports may be fitted with such a powering port.

The preferred type of conveyor is one in which direct-current motors are distributed along the length of the conveyor, and these motors are arranged to run or draw power only when a flat tray or tub is located within the region under the influence of the particular motor. Each of these motors or groups of motors is associated with an AC-to-DC converter, for converting alternating source power into direct voltage for the motors and motor controllers.

For reasons of safety, the alternating voltage used to power the AC-to-DC converters along the length of the conveyor is relatively low, and in one embodiment is in the vicinity of 19 volts AC. At this relatively low voltage, load currents are quite large at only moderate loads. For cost reasons, the sources of low AC voltage associated with the various mail container ports of the towers provide only limited current, as for example in the vicinity of 30 amperes. The length of conveyor which can be driven by the low AC voltage and 30-ampere current is limited, and in one embodiment the maximum length of conveyor which can be run is 33 feet. In this particular embodiment, the length of the conveyor which can be powered is maximized by the use of two separate power ports, both at 19 volts AC, each at 15 amperes. One of the two 15A ports drives the first section or portion 12*a* (about 16 feet) of the conveyor 12, and the second port drives the second half 12*b*; this arrangement has the advantage of reducing the IR (heating) losses, in the connecting wires to the second half of the conveyor, which are attributable to the current drawn by the first half of the conveyor. In FIG. 1, the two 19-volt, 15A sources are designated 20*a* and 20*b*. The first 19-volt power source 20*a* is connected to a "primary" conductor or bus 22*a*, which powers the first 3-foot conveyor section 12*a*1, and also the second 10-foot section 12*a*2. Section 12*a*1 is only 3 feet in length, because it is especially made to mate with the tower, and is adaptable for use with a "pusher" which pushes the mail containers into the input port 10*i*. A bypass cable or conductor 24*a* is connected to low-voltage supply port 20*b* at the tower 10 end, and extends to the power 10-foot conveyor sections 12*a*3 and 12*a*4 by way of the primary conductor 26*a*. This arrangement allows the two conveyor sections 12*a*3 and 12*a*4 to be powered in a manner in which the IR or resistive drop in the powering conductors 24*a* and 26*a* is independent of the current in conveyor sections 12*a*1 and 12*a*2.

As a result of the need to locate the tower close to the associated processing station, a conveyor having a length exceeding 33 feet may be required. As illustrated in FIG. 1, the tower also includes a further AC power output port 20*c* is associated with the mail-handling port 10*i*. This further AC power output port 20*c* provides AC power, which may be at the full supply voltage available to the tower, or at some reduced AC voltage. In one embodiment, the full line voltage available to the tower is 208 volts, and the reduced line voltage at port 20*c* is 120 VAC. The available AC power at the further AC port 20*c* is coupled by a path 28 to a location at the end of first 33-foot section of conveyor, at which location a transformer 30 converts the 120 VAC to 19 VAC, for powering a further 40-foot section 12*b* of conveyor 12. Transformer 30 does not receive power from primary conductor 26*a*, and bypass conductor 24*a*' is not powered at all, since conveyor sections 12*a*3 and 12*a*4 are powered by primary conductor 26*a*.

Conveyor section 12*b* includes two 10-foot sections 12*b*1 and 12*b*2, which are powered by low-voltage AC from transformer 30 by way of primary power conductor 22*b*. Power is fed to primary conductor portion 26*b* from bypass conductor portion 24*b*. Sections 12*b*3 and 12*b*4 of conveyor 12*b* are powered by primary conductor portion 26*b*. Bypass conductor portion 24*b*' is not powered. Thus, the total length of conveyor 12 which can be powered from the tower is 73 feet.

FIG. 2 is a simplified representation of one ten-foot section of conveyor 12 of FIG. 1. For definiteness, the section illustrated is chosen to be section 12*a*3, but all of the section are identical (except for the three-foot section 12*a*1, which is shorter in axial length). In FIG. 2, a pair of support side rails $\mathbf{210}_1$ and $\mathbf{210}_2$ extend parallel with each other, and support a set of rollers, one of which is designated 212. The power rollers are controlled in sets of four, so each subsection of conveyor 12*a*3 contains four power rollers. Each power roller may drive additional slave rollers by means of gears or belts. The power rollers are powered by direct-current motors associated with power cards mounted on the siderails $\mathbf{210}_2$. In FIG. 2, the four power cards (PC) are designated 212*a*, 212*b*, 212*c*, and 212*d*. A power supply designated as 214 is coupled to primary bus 26*a*. The bypass bus 24*a*' simply extends along the side rail $\mathbf{210}_2$, and terminates at connectors $\mathbf{240}_1$ and $\mathbf{240}_2$. Primary bus 26*a* is terminated at the left end at a connector $\mathbf{260}_1$ and at the right end at a connector $\mathbf{260}_2$. It should be noted that busses 24*a*' and 26*a* are multiconductor sets, rather than single conductors; in a preferred embodiment, each bus contains two power conductors and a ground conductor. Conveyor sections such as that described in conjunction with FIG. 2 are sold by Siemens ElectroCom. In normal use of conveyor sections such as that of FIG. 2, two kinds of electrical connections are made. The first type of electrical connection is that which is used when the conveyor section is adjacent the source of low-voltage AC for that conveyor section, and includes coupling both the primary connector $\mathbf{260}_1$ and the bypass connector $\mathbf{240}_1$ to the source 320 of low-voltage AC. Those conveyor sections more distant from the source 320, but still near the source of low-voltage AC, have their connectors $\mathbf{260}_1$ connected to connector $\mathbf{260}_2$ of the first conveyor. Those conveyor sections more remote from the source of low-voltage AC will have their connectors $\mathbf{260}_1$ connected to connectors $\mathbf{240}_2$ of the electrically-earlier conveyor. The conveyor most remote from the source of low-voltage AC will not have any further connections to its connectors $\mathbf{240}_2$ and $\mathbf{260}_2$.

Improved tower conveyor arrangements are desired.

SUMMARY OF THE INVENTION

A mail-handling assemblage according to the invention includes a tower for buffering the flow of mail containers. The tower includes first and second mail container ports, one of which is for the ingress of the mail containers, and the other of which is for egress of the mail containers after a period of time related to the buffering provided by the tower. The tower also includes a power port associated with one of the first and second container ports. A powering arrangement is coupled to the tower for powering the tower. A cutoff switch is coupled to the powering arrangement, for, when operated, cutting power from the tower. A first conveyor is associated with one of the container ports, and conveys mail containers to or from the associated port. The first conveyor includes at least one transducer power card and associated motor along its length, for converting electrical power into mechanical power which performs the conveying of the mail containers. The first conveyor has a maximum length between the one of the container ports and a remote end of the first conveyor. The maximum length of the first conveyor between the container port and the remote end is determined by the ability to couple energy from the power port to the most remote portion of the first conveyor. The first conveyor includes a sensing port located at the remote end for allowing a signal associated with the power to be sensed by relay. A length of second conveyor has a near end juxtaposed with the most remote end of the first conveyor, for conveying the mail containers at locations beyond the remote end of the first conveyor. The second conveyor includes a power input port for energizing the second conveyor. The assemblage also includes a control box electrically coupled to a source of energization, to the power input port of the second conveyor, and to the sensing port of first conveyor, for coupling power to the power input port of the second conveyor only during those intervals in which the signal is present at the sensing port.

DESCRIPTION OF THE INVENTION

Figure 1:
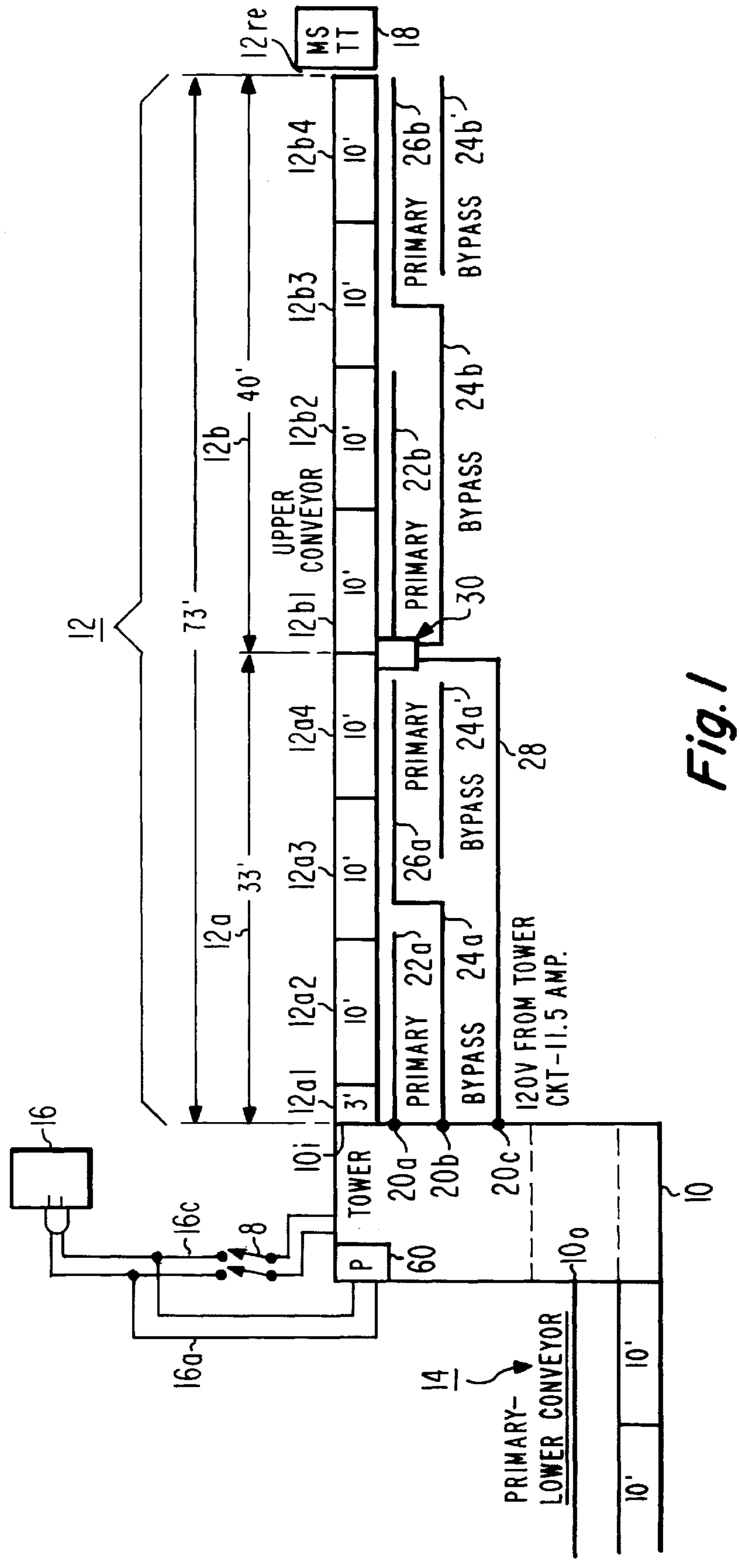
FIG. 1 is a simplified diagram illustrating a tower and associated conveyor arrangement.

In FIG. 1, a computer or processor 60 is included within a portion of tower 10. Processor 60 provides various tower function control. As illustrated in FIG. 1, processor 60 is powered by way of a conductor set 16*a* from source 16. The main power for mechanical motion for the tower is provided through a conductor 16*c* and an emergency cutoff switch 8. Thus, the emergency cutoff switch can deenergize all the motors associated with the tower, and also deenergizes the power sources 20*a*, 20*b*, and 20*c*, which in turn simultaneously deenergizes the 73-foot section of the conveyor 12.

Figure 3:
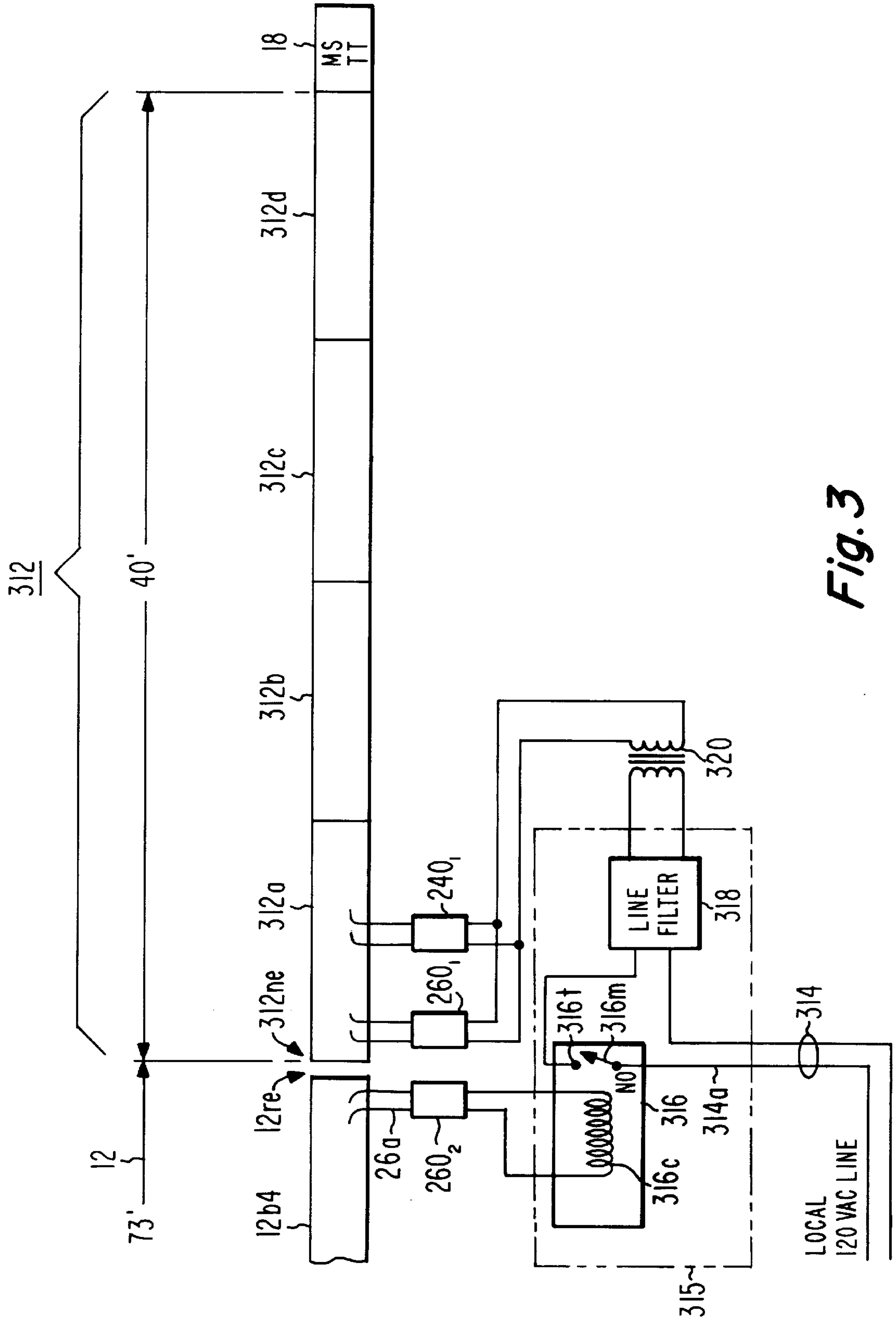
FIG. 3 is a simplified diagram of an arrangement similar to that of FIG. 1, but including a further section of conveyor.

In the event that additional length of conveyor, beyond 73 feet, is needed, an arrangement such as that illustrated in FIG. 3 is used. In FIG. 3, an additional 40' length of conveyor 312 includes four ten-foot sections 312*a*, 312*b*, 312*c*, and 312*d*, each of which is identical to ten-foot sections of conveyor 12 of FIG. 1. The left end of conveyor 312 is juxtaposed to the right end of conveyor section 12*b*4 of FIG. 1, and the mail source tilt table 18 is illustrated as being at the right of conveyor section 312*d*.

According to an aspect of the invention, the power for the additional conveyor section 312 is provided from a local AC line source by way of a relay energized by low-voltage AC from the end of the conveyor section closer to the tower. More particularly, the local AC line in FIG. 3 is coupled over a power conductor path 314 to a relay box 316 of a power control box 315. Relay box 316 includes a relay coil 316*c*, a movable relay contact 316*m*, and a relay terminal 316*t*. Relay coil 316*c* is connected to the low-voltage alternating voltage from connector $\mathbf{260}_2$, which is the bus which provides power to the power cards of the “previous” conveyor section as viewed from the electrical power point of view. As described, however, the “previous” conveyor section from the electrical point of view is the “following” or “later” section from the mechanical point of view, as the mail containers move from right to left in the drawings.

In the arrangement control box 315 of FIG. 3, the movable contact 316*m* of relay 316 switches conductor 314*a*, so as to switch the power to line filter 318. The switched power is coupled from line filter 318 to a step-down transformer 320, which produces a low AC output voltage (19 volts) in response to application of 120VAC to its primary windings. The low AC output voltage of transformer 320 is coupled to connectors $\mathbf{260}_1$ and $\mathbf{240}_1$ of the first conveyor section 312*a* of conveyor 312, for energizing that first conveyor section, and the other conveyor sections 312*b*, 312*c*, and 312*d* coupled thereto.

In operation of the arrangement of FIG. 3, low-voltage AC is produced by transformer 320 and supplied for powering of additional conveyor section 312 when there is line voltage available on path 314 and only in the presence of low-voltage AC signal at port $\mathbf{260}_2$ of the (electrically) last conveyor section (12*b*4 in the example) of conveyor 12. Consequently, if emergency stop switch 8 of FIG. 1 should be set to the open position, so as to shut down or deenergize the mechanical portions of the tower 10 and conveyor 12, signal, in the form of 19VAC, is also removed from relay coil 316*c*, which in turn opens contact 316*m*, to thereby remove AC line power from the primary winding of transformer 320. This, in turn, deenergizes the entirety of conveyor portion 312.

Other embodiments of the invention will be apparent to those skilled in the art. For example, it will be apparent that additional sections of conveyor can be added, ten feet at a time, to the right ends of the illustrated conveyors. Each time an additional 40-foot section, or portion thereof, is to be added, an additional power control box 315 and transformer 320 are added, and connected as described. While the relay 316 has been illustrated as switching the line voltage applied to the primary winding of transformer 320, the transformer could be continuously powered, and the relay contacts could switch the secondary voltage, although this might require greater current-handling capability in the relay contacts. While the connectors $\mathbf{240}_1$, $\mathbf{240}_2$, $\mathbf{260}_1$, and $\mathbf{260}_2$ have been illustrated as being loose from the physical structure of the conveyor section 12*a*3, they may be physically connected to, and supported by, the side rail 2102, or other suitable structure. If desired, key-configured connectors may be used to aid in avoiding incorrect connections.

Figure 2:
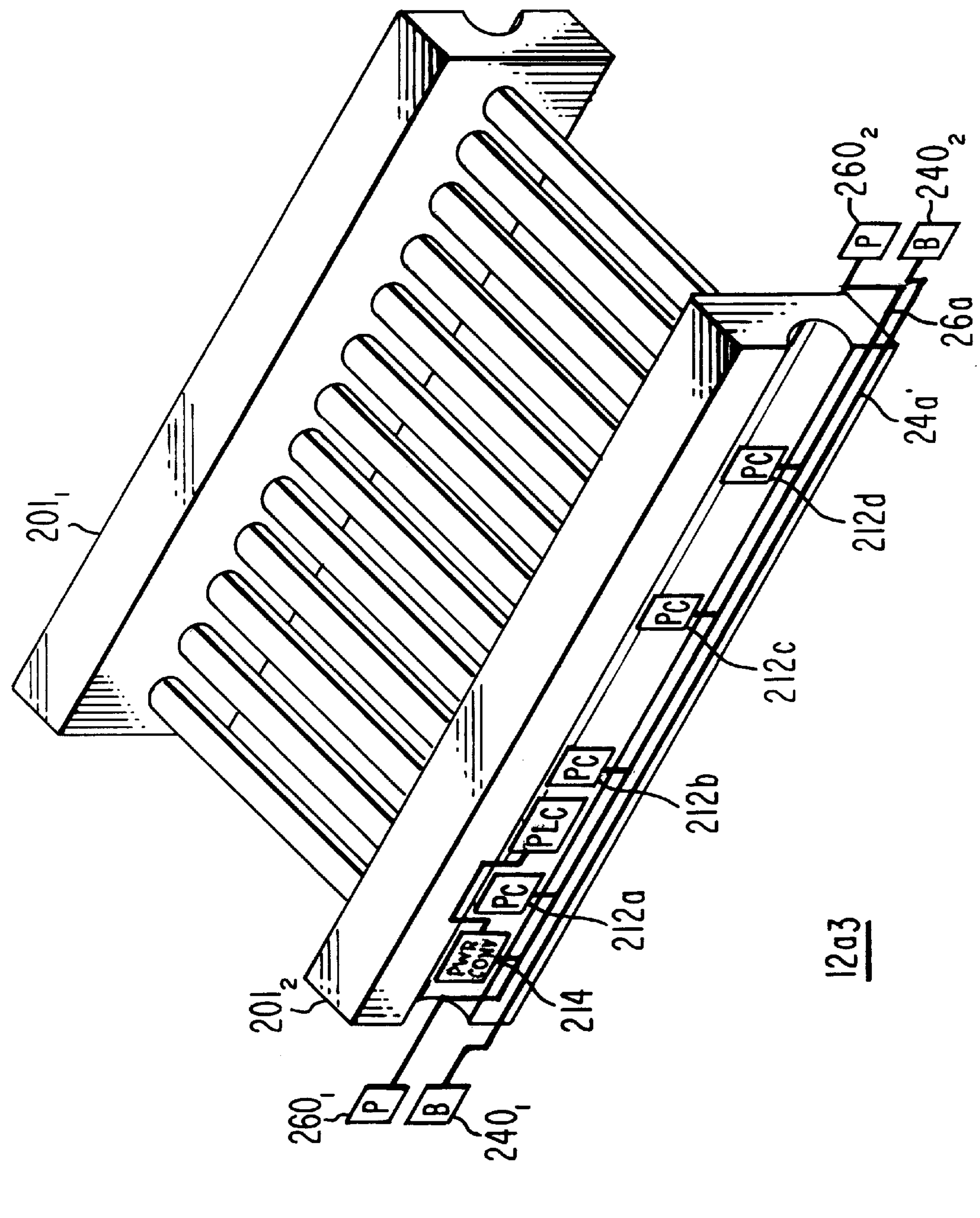
FIG. 2 is a simplified representation of a section of conveyor of FIG. 1, illustrating the various power transducers, power cables and other electrical ports.

Thus, a mail-handling assemblage according to the invention includes a tower (10) for buffering the flow of mail containers. The tower (10) includes first and second mail container ports, one of which (10*i*) is for the ingress of the mail containers, and the other of which (10*o*) is for egress of the mail containers after a period of time related to the buffering provided by the tower (10). The tower (10) also includes a power port (20*a*, 20*b*, 20*c*) associated with one of the first (10*i*) and second (10*o*) container ports. A powering arrangement (16, 16*c*) is coupled to the tower (10) for powering the tower (10). A cutoff switch (8) is coupled to the powering arrangement, for, when operated, cutting power from the tower (10). A first conveyor (12) is associated with one of the container ports (10*i*), and conveys mail containers to or from the associated port. The first conveyor includes at least one transducer (power card 212*N* of FIG. 2 and associated motor) along its length for converting electrical power into mechanical power which performs the conveying of the mail containers. The first conveyor (12) has a maximum length between the one of the container ports (10*i*) and a remote end ($\mathbf{12}_{re}$) of the first conveyor (12). The maximum length of the first conveyor between the container port (12*i*) and the remote end ($\mathbf{12}_{re}$) is determined by the ability to couple energy from the power port (20*a*, 20*b*, 20*c*) to the most remote portion (12*b*4) of the first conveyor (12). The first conveyor (12) includes a sensing port ($\mathbf{260}_2$) located at the remote end ($\mathbf{12}_{re}$) for allowing a signal (19 VAC) associated with the power to be sensed (by relay 316). A length of second conveyor (316) has a near end ($\mathbf{312}_{ne}$) juxtaposed with the most remote end ($\mathbf{12}_{re}$) of the first conveyor (12), for conveying the mail containers at locations beyond the remote end ($\mathbf{12}_{re}$) of the first conveyor (12). The second conveyor (312) includes a power input port ($\mathbf{240}_1$, $\mathbf{260}_1$), for energizing the second conveyor (312). The assemblage also includes a control box (315) electrically coupled to a source (314) of energization, to the power input port ($\mathbf{240}_1$, $\mathbf{260}_1$) of the second conveyor (312), and to the sensing port ($\mathbf{260}_2$) of first conveyor (12), for coupling power to the power input port ($\mathbf{240}_1$, $\mathbf{260}_1$) of the second conveyor (312) only during those intervals in which the signal (19VAC) is present at the sensing port ($\mathbf{260}_2$).

What is claimed is:

1. A mail-handling assemblage, comprising:

a tower for buffering the flow of mail containers, said tower including first and second container ports, one of which is for the ingress of said mail containers, and the other of which is for egress of said mail containers after a period of time related to the buffering provided by said tower, said tower also including a power port associated with one of said first and second container ports;

powering means coupled to said tower for powering said tower;

a cutoff switch coupled to said powering means, for, when operated, cutting power from at least a portion of said tower;

a first conveyor associated with one of said container ports, said first conveyor being for conveying mail containers to or from said associated port, said first conveyor including at least one transducer along its length for converting electrical power into mechanical power which performs said conveying of said mail containers, said first conveyor having a maximum length between said one of said container ports and a remote end of said first conveyor, said maximum length of said first conveyor between said container port and said remote end being determined by the ability to couple energy from said power port to the most remote portion of said first conveyor, said first conveyor including a sensing port located at said remote end for allowing a signal associated with said power to be sensed;

a length of second conveyor having an end juxtaposed with said most remote end of said first conveyor, for conveying said mail containers at locations beyond said remote end of said first conveyor, said second conveyor including a power input port, for energizing said second conveyor; and a control box electrically coupled to a source of energization, to said power input port of said second conveyor, and to said sensing port of first conveyor, for coupling said energization to said power input port of said second conveyor only during those intervals in which said signal is present at said sensing port, whereby, when said portion of said tower is deenergized by operation of said cutoff switch, said signal no longer appears at said sensing port, and said source of energization is decoupled from said second conveyor.

* * * * *